(12) United States Patent
Huntington (10) Patent No.: US 6,643,121 B1
(45) Date of Patent: Nov. 4, 2003

(54) SOLID STATE CAPACITORS AND METHODS OF MANUFACTURING THEM

(75) Inventor: David Huntington, Bovey Tracey (GB)

(73) Assignee: AVX Limited (GB)

( * ) Notice: Subject to any disclaimer, the term of this patent is extended or adjusted under 35 U.S.C. 154(b) by 0 days.

(21) Appl. No.: 10/030,569

(22) PCT Filed: Jul. 7, 2000

(86) PCT No.: PCT/GB00/02629

§ 371 (c)(1),
(2), (4) Date: Aug. 19, 2002

(87) PCT Pub. No.: WO01/04919

PCT Pub. Date: Jan. 18, 2001

(30) Foreign Application Priority Data

Jul. 8, 1999 (GB) ................................................ 9916048

(51) Int. Cl.[7] ................................................ H01G 9/00
(52) U.S. Cl. .................. 361/523; 361/528; 361/532; 29/25.03
(58) Field of Search ................................. 361/523, 524, 361/528, 529, 532, 540; 29/25.03

(56) References Cited

U.S. PATENT DOCUMENTS 5,357,399 A  * 10/1994  Salisbury ..................... 361/529
5,812,366 A  *  9/1998  Kuriyama .................... 361/686

FOREIGN PATENT DOCUMENTS

WO   WO0028559   5/2000

* cited by examiner

Primary Examiner—Anthony Dinkins
(74) Attorney, Agent, or Firm—Dority & Manning (57) ABSTRACT

The application relates to the field of solid state capacitors. The invention particularly relates to an improved method of manufacturing multiple capacitors on a substrate. According to one aspect of the present invention there is provided a method of manufacturing solid state capacitors comprising: providing an electrically conducting substrate having a plurality of apertures formed therethrough; forming plurality of porous bodies comprising valve action material on the substrate, a portion of each porous body being accommodated in an associated aperture; forming an electrically insulating layer over the free surface of the porous bodies; forming a conducting cathode layer over the electrically insulating layer applied to the porous bodies; and providing cathode termination means on an exposed underside surface of each coated porous body accommodated in the aperture, providing anode termination means on an underside surface of the substrate adjacent the aperture, the anode termination forming an electrical contact with the substrate material and the cathode termination forming an electrical contact with the cathode layer, and dividing the substrate into individual capacitor units, each comprising a porous body accommodated in an aperture-defining portion of the substrate.

12 Claims, 13 Drawing Sheets

KEY:
- Sputter Layer
- Carbon
- TaO5
- MnO2
- Silver
- Epoxy Resin
- Tantalum

*Fig. 17B*

SOLID STATE CAPACITORS AND METHODS OF MANUFACTURING THEM

The present invention relates to the field of solid state capacitors. The invention particularly relates to capacitors of the type in which a powder-formed valve action metal forms a highly porous anode body portion of a capacitor, an electrically insulating dielectric layer is formed though the porous structure of the anode body, and a conducting cathode layer is formed on the dielectric layer and which is then electrically connected to a cathode terminal, the anode body being electrically connected to an anode terminal.

U.S. Pat. No. 5,357,399 (Salisbury) describes a method for simultaneously manufacturing multiple such capacitors from a porous tantalum layer sintered to a tantalum substrate. The porous layer is machined to form the anode bodies of each capacitor. After processing a top plate (substrate lid) is bonded to a the top ends of the anode bodies. The substrate/anode bodies/lid sandwich is than diced to separate a plurality of individual capacitors in each of which the substrate material forms the anode terminal and the lid material forms the cathode terminal. PCT application CB99/03566 (AVX Ltd) concerns a modified version of the Salisbury method in which the volumetric efficiency of the capacitors produced is optimized by removing the need for a substrate lid as the cathode terminal of each capacitor, thereby increasing the specific capacitive volume.

The foregoing methods permit the manufacture of very small but highly efficient capacitors. However the continued pressure of electronic circuit board design towards miniaturization of components and ease of assembly of such boards maintains a continued need for capacitors of improved volumetric efficiency and reduced component windows (or footprint) on the circuit board.

The present invention seeks to provide improved capacitors and improved methods of manufacturing such capacitors.

According to one aspect of the present invention there is provided a method of manufacturing solid state capacitors comprising: providing an electrically conducting substrate having a plurality of apertures formed therethrough; forming plurality of porous bodies comprising valve action material on the substrate, a portion of each porous body being accommodated in an associated aperture; forming an electrically insulating layer over the free surface of the porous bodies; forming a conducting cathode layer over the electrically insulating layer applied to the porous bodies; and providing cathode termination means on an exposed underside surface of each coated porous body accommodated in the aperture, providing anode termination means on an underside surface of the substrate adjacent the aperture, the anode termination forming an electrical contact with the substrate material and the cathode termination forming an electrical contact with the cathode layer, and dividing the substrate into individual capacitor units, each comprising a porous body accommodated in an aperture-defining portion of the substrate. In this way a plurality of capacitors may be manufactured, which capacitors have anode and cathode terminals on a common face of the capacitor.

Preferably respective anode and cathode termination means on each capacitor have generally coplanar exposed contact surfaces so that the capacitor may stand with its underside on a flat surface with the contact surfaces on the flat surface.

The porous bodies may be formed from a pre-form layer of porous valve action material pressed onto a top surface of the substrate. The pre-form layer may be machined or cut to form the individual porous bodies over the aperture and substrate top surface. Other shaping processes may be used however.

In one aspect of the invention both the porous body free surface and exposed substrate surface are coated with the insulating layer and a portion of the insulating layer over the substrate is removed in order to allow an electrical contact with the substrate.

A surface portion of the substrate underside may be masked to prevent formation of a dielectric layer and cathode layer thereon.

Preferably a conducting coating is provided over the cathode layer on the porous body. The conducting coating may extend over a substantial proportion of the surface of the porous body.

In another aspect of the invention a conducting wick is formed in the porous body, which wick electrically connects conducting layers applied to different ends or sides of the porous body. This reduces the internal ESR of the capacitive body, improving device performance According to yet another aspect of the invention there is provided a solid state capacitor comprising: an electrically conducting substrate member; a porous body comprising valve action material abutting a surface portion of the substrate; an electrically insulating layer forced over the free surface of the porous cathode; a conducting cathode layer formed over the electrically insulating layer applied to the cathode body free surface; and an anode terminal in electrical contact with a surface of the substrate member and a cathode terminal provided in electrical contact with a surface of the porous body, wherein the terminals are formed on a common surface of the capacitor.

The substrate member may form an exposed frame on an underside of the capacitor with an anode terminal formed thereon and the cathode terminal is formed on a portion of the porous body surface located within the frame.

The frame may be open at one end, thereby giving a generally horse shoe configuration to the substrate member.

The anode terminal body and the anode body may each be formed from a pre-form layer of porous valve action material that has been applied to the substrate. The pre-form may be applied by laying a green, unsintered mixture of valve action metal powder and binder/lubricant on the substrate. The green mixture may then be sintered to fuse the powder into a solid highly porous pre-form, the binder/lubricant being burnt off during sintering.

The pre-form layer may be machined to form the porous bodies. Typically longitudinal and lateral grinding cuts may be employed in order to produce a network of rectilinear porous bodies on the substrate, separated by ☐streets☐ corresponding to the path of the grinding cut. Naturally more complex shapes can be produced by conventional machining techniques, as required.

The insulating layer may be a dielectric layer of an oxide of the valve action metal, applied for example by conventional anodization techniques in order to build up gradually an oxide of the required thickness and integrity. In one example in which the valve action layer is tantalum, a layer of tantalum pentoxide is built up on the bodies.

The cathode layer may be applied by dipping of the anode and cathode bodies into a precursor solution of, for example manganese nitrate solution. The layer of manganese nitrate formed on the bodies may be heated to oxidise the nitrate to manganese dioxide. Repeated dipping steps may be necessary in order to build-up the optimum cathode layer.

It may be necessary to remove cathode and insulating layer material from those parts of the substrate which are to form the anode terminal so that an electrical connection to the valve-action material may be made. Removal of the layers may be by machining, for example grinding, or by etching, for entangle RF etching. In one example grinding cuts are made along a top surface of each anode, thereby exposing valve action material. The top surface may then be given a termination process to form the anode terminal.

A termination process is also carried out on a surface of the porous body, in which carbon and silver layers are formed on the conducting cathode layer of the top surface. These two conducting layers provide a terminal for electrical connection, by for example soldering, to an electrical or electronic circuit.

The spaces between the porous bodies on a substrate may be filled with an insulating material, for example a liquid plastics resin which solidifies to form a protective encapsulation of the bodies. Naturally the resin must leave the terminals exposed. This may require the use of masking over the terminal contacts.

The next step which must be carried out is separation of the or each capacitor from the bulk substrate. This may be achieved by machining by for example a grinding cut. If necessary a rigid backing support may be provided for the substrate so as to provide the necessary structural rigidity to permit cutting without damaging the capacitors. One example of a suitable material is glass which is adhered to the substrate by means of a suitable adhesive. UV sensitive adhesive tape may conveniently be used, release of the separated capacitors being effected by exposing the adhesive on the tap to UV energy.

Any valve action material suitable for use in the formation of a solid state capacitor may be used in the process. A preferred example is tantalum, but other metals such as niobium and valve-action non-metals may be used. Preferably the substrate is formed from the same material as the anode, so as to provide chemical compatibility and uniform expansion during heating (sintering).

Following is a description by way of example only and with reference to the accompanying drawings of methods of putting the present invention into effect.

In the drawings, FIGS. 1 to 7 illustrate schematically one process according to the present invention. FIGS. 8 and 9 show individual capacitors produced by the methods of the invention. FIGS. 17 and 18 show capacitors produced by that method.

In particular:

FIG. 7 shows a cutting process for separating individual capacitors.

FIGS. 10 to 16 show schematically the process according o the third specific embodiment.

FIG. 17A' is an enlarged section of FIG. 17A showing the layering of the capacitor.

SPECIFIC EMBODIMENT 1

Figure 1A:
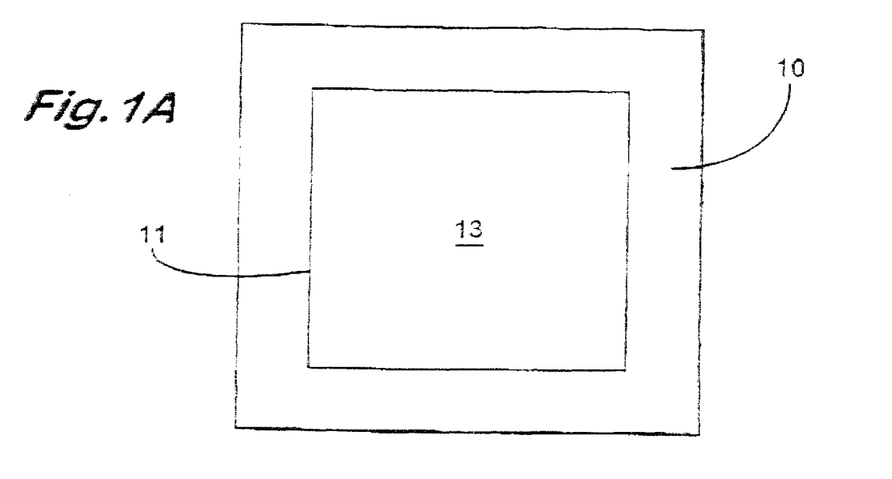
FIG. 1A is a plan view of small portion of the underside of a tantalum substrate having a porous body formed thereon.
Figure 1B:
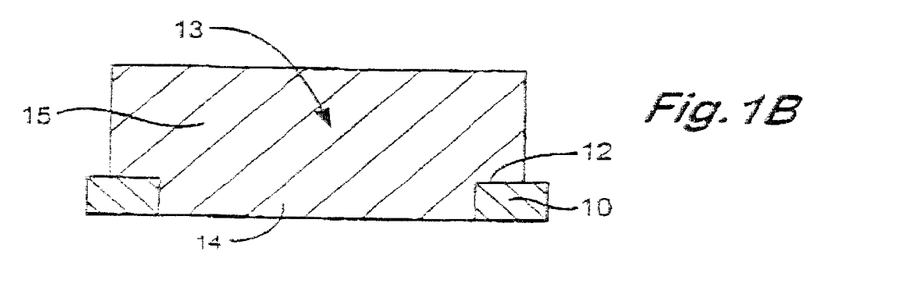
FIG. 1B is sectional view from one side of the same substrate.

A solid substrate 10 of, for example, 0.25 mm thick tantalum wafer is provided (only a local section of the substrate is shown). The wafer is formed with a regular array of square plan apertures 11 arranged in rows and columns (one aperture only shown). Differently shaped apertures may be formed, for example rectangular of circular. A top surface 12 of the substrate is covered with a fine dispersion of tantalum powder grains (not shown). The grains are fused to the tantalum plate by sintering to form a seed layer. A conventional "green" mixture of tantalum powder and binder/lubricant is then pressed onto the top surface. The pressing process forces the green mixture into the apertures as well as forming a uniform layer of green mixture over the substrate top surface. Pressing is carried out with the substrate placed on a flat surface. This ensures that green mixture entering the apertures is constrained against flowing beyond the plane represented by the substrate lower surface.

The seed layer provides mechanical keying and enhances the bond between the green (unsintered) mixture and the substrate. The green powder mixture is then sintered to form an inter-connecting highly porous matrix of fused tantalum powder particles. The binder burns off during the sintering process.

The next step in the process is a machining process. In this process the sintered porous layer applied to the substrate top surface is shaped by grinding to form a plurality of square plan blocks 13. Each block corresponds to an aperture in the substrate. Each block has a lower neck portion 14 which is accommodated in the aperture, as shown in the FIG. B and an upper portion 15 which sits on the substrate upper surface.

Once the blocks have been formed the whole assembly is subjected to a conventional anodization process in which a tantalum pentoxide ($Ta_2O_5$) dielectric layer (not shown) is gradually built up on the exposed tantalum surface of the substrate and throughout the porosity of the blocks.

Figure 2A:
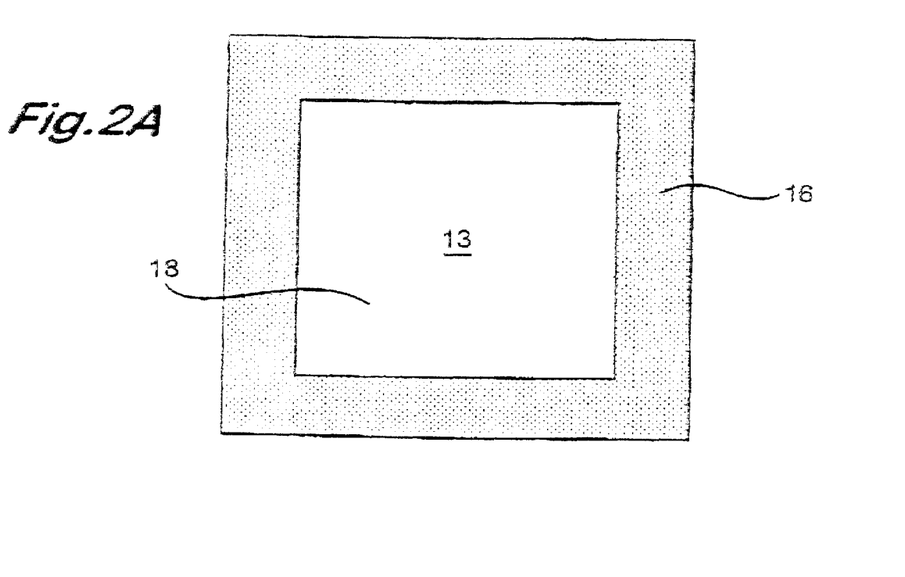
FIGS. 2A & 2B show the application of a protective masking to the substrate.
Figure 2B:
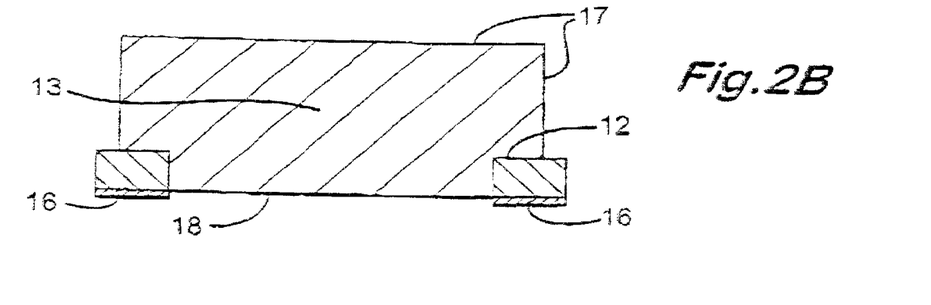

Once the oxide layer has seen formed a protective masking layer 16 (in FIG. 2) is applied to the underside of the substrate. The mask covers only the exposed underside surface of the solid tantalum substrate 10, thereby leaving upper 17 and lower 18 surfaces of the porous blocks exposed.

The substrates are row subjected to a cathode layer formation process in order to from a conducting layer (not shown) on the previously applied dielectric layer. The cathode layer is formed by a manganization procedure in which the substrate is dipped into manganese nitrate solution in order to coat the exposed substrate and porous blocks with Manganese nitrate. The coating is then oxidized by heating in an oxygen-containing atmosphere, thereby, to convert the nitrate to manganese dioxide ($MnO_2$). The dipping and heating steps may be repeated until a coating of the required thickness and coherency has been achieved.

The masking is now removed from the underside of the substrate, thereby removing cathode layer coating from the underside surface of the tantalum substrate. The masking may take the form of a resist coating which may be removed in response to chemical or environmental treatment, or may be a tape which is peeled away to remove the cathode layer coating carried by the tape.

Figure 3A:
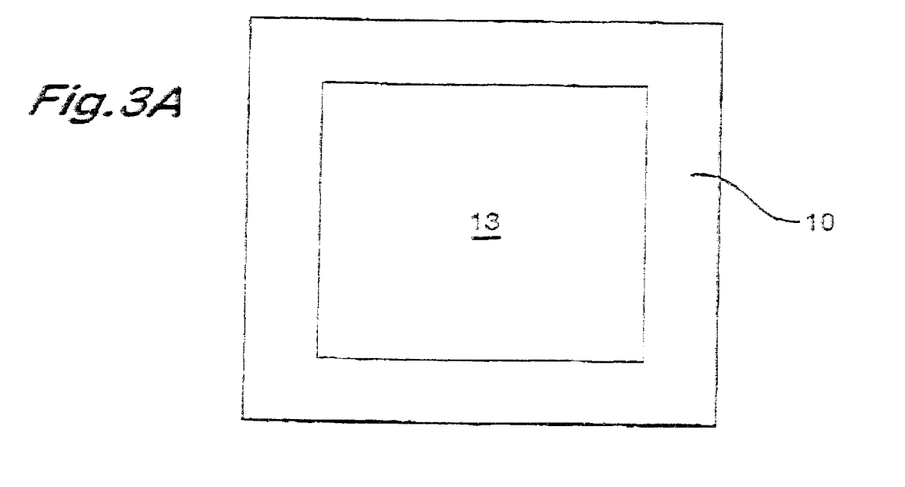
FIGS. 3A & 3B show the formation of an isolation cut in the substrate.
Figure 3B:
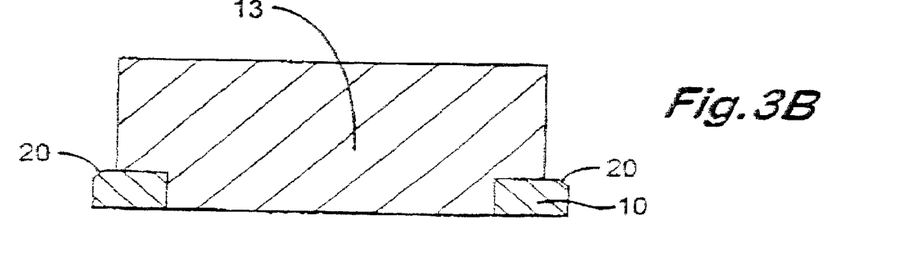

The solid substrate material 10 will serve to be the anode portions of the final capacitors, so it is necessary to isolate the anode from the cathode layer applied to the top surface of the substrate. To this end isolation cuts 20 are made along the centre lines of the rows and columns which represent the space between individual blocks on the top surface of the substrate. The cuts are made by a fine grinding tool which removes cathode layer material as well as the underlying tantalum pentoxide layer.

After the isolation cuts have been made a second anodization process is carried out in order to cover the newly exposed isolation cuts with a tantalum pentoxide dielectric layer. The dielectric is removed from localised underside surfaces of the substrate to provide direct access to the bare metal for anode terminals. Removal of the dielectric may be by machining, etching or another suitable process.

Figure 4A:
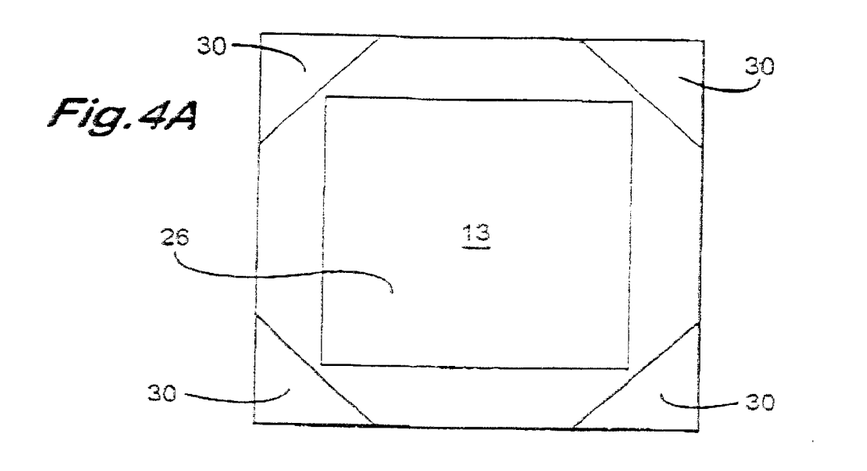
FIGS. 4A & 4B show the termination process in which anode and cathode contacts are formed.
Figure 4B:
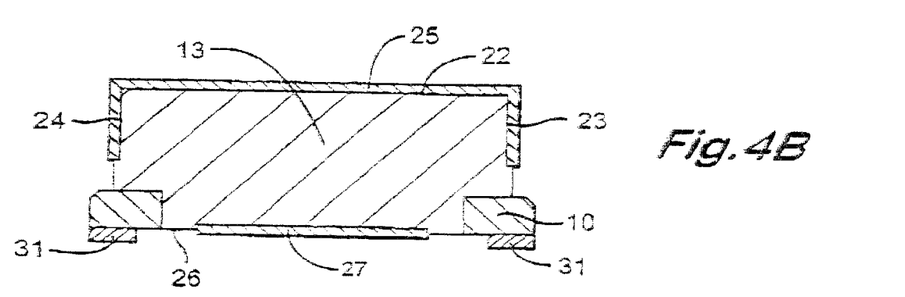

The next step is a termination process in which cathode and anode terminal contacts are applied to surface regions of the porous blocks and substrate. This process is illustrated in FIG. 4. The upper end regions of each porous block are coated with conducting carbon paste (not shown) which is then cured. The coating covers the top surface 22 of each block 13, as well as an upper region of each of the four sides 23, 24 etc. of the block. Once the carbon layer has cured, a silver paste 25 is applied to the carbon layer and allowed to cure. The underside surface 26 of the block, framed by the substrate 10, is also coated in carbon and silver 27 layers in a similar fashion. The carbon/silver contacts create electrical contact with the manganese dioxide cathode layer previously applied to the porous blocks, providing cathode termination.

With regard to the anode termination, multiple RF etch windows 30 are created on the underside of the substrate. Each window shown has a generally triangular configuration, occupying corner portions of the substrate frame 10 around the porous block centre square. The etch removes dielectric material form the surface of the substrate, allowing direct access to the tantalum metal of the substrate. The freshly exposed metal revealed by the etching process is sputter coated with a conventional tri-metal combination in order to create anode contacts 31. Silver contacts are applied to these anode contacts to facilitate subsequent integration of the capacitors to an electric or electronic circuit.

Figure 5A:
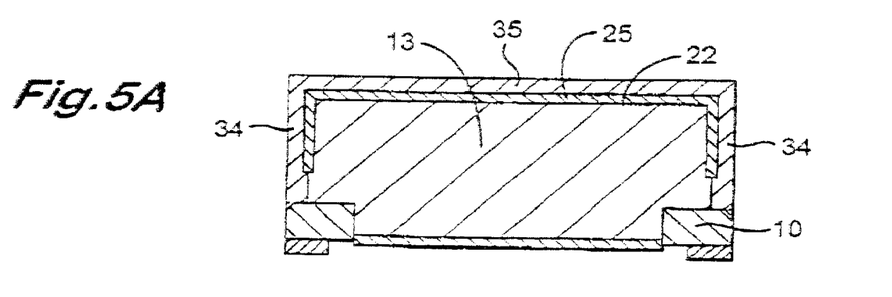
FIGS. 5A & 5B show an encapsulation process.
Figure 5B:
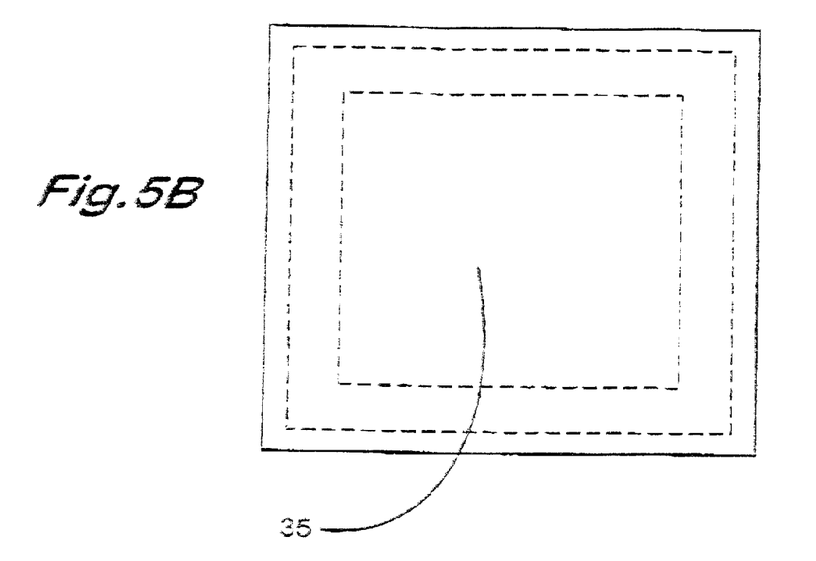

An encapsulation process (FIG. 5) is carried out in which the spaces 34 between blocks 13 on the upper surface of the substrate, and the top surface 22 of the blocks are encapsulated in an electrically insulating protective resin 35. A number of conventional techniques may be used to effect encapsulation. In one process the underside of the substrate, with its anode and cathode contact points is covered with a protective membrane. The upper surface is covered with a liquid resin compound which flows to occupy the free space. The level of the liquid is increased until the tops of all of the blocks are covered. The resin is allowed to set.

Figure 6A:
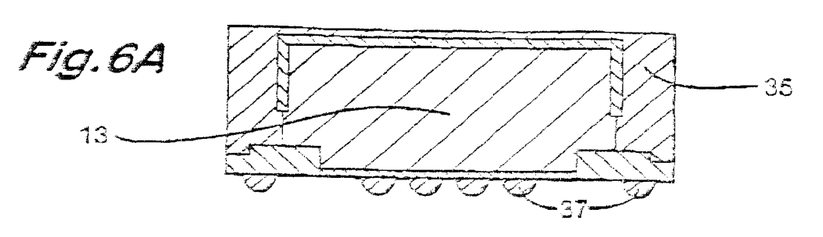
FIGS. 6A & 6B show a final step in the termination process in which solder bumps are applied to the contacts.
Figure 6B:
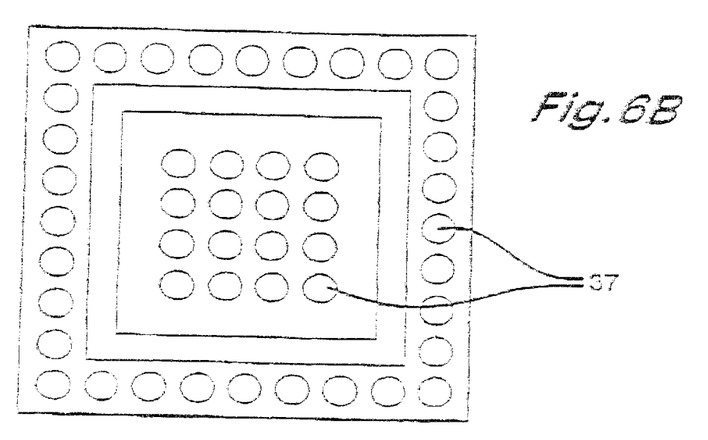

The protective masking (not shown) may now be removed, exposing the anode and cathode contacts on the underside of the substrate. In certain cases (depending upon the application) multiple solderable silver bumps 37 may be added to the anode and cathode contacts, as shown in the FIG. 6. These create multiple contact points, giving flexibility of connection to a printed circuit board or the like. As an alternative to silver bumps, tin/nickel plate can be applied to the contacts.

Figure 7:
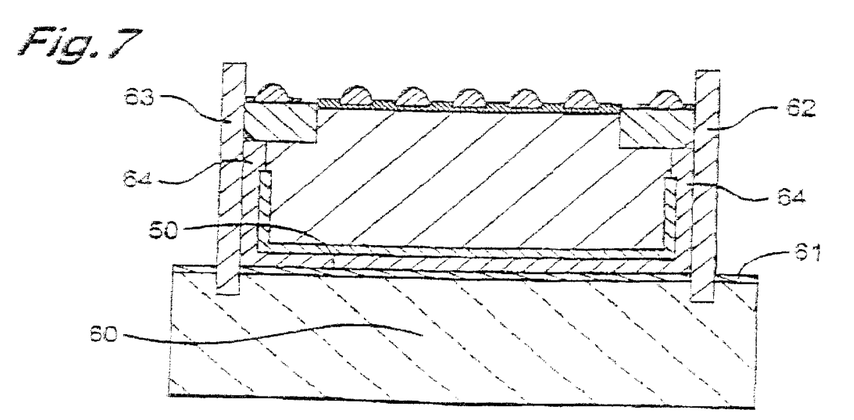
Figure 8A:
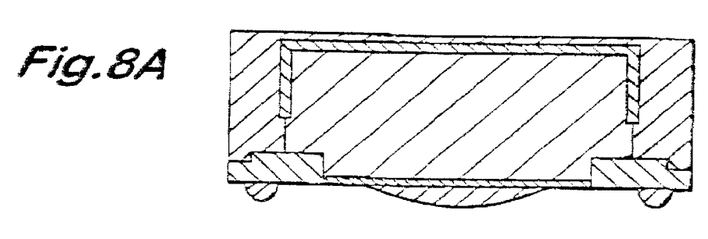
FIGS. 8A & 8B show one example of a capacitor produced by the method of the first specific embodiment of the present invention.
Figure 8B:
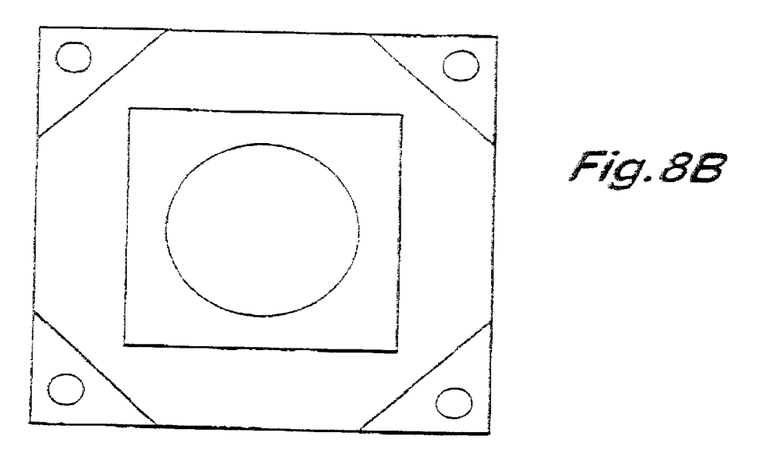

The final stage described is separation of the individual capacitors from the substrate for which refer to FIG. 7. A top surface of the encapsulated upper surface 50 of the substrate is attached to a glass plate 60 by means of UV releasable adhesive rape 61. Cutting wheels 62, 63 are used to cut through the resin channels 64 separating individual capacitors. The cut continues through the substrate and into the glass base 60. Horizontal and vertical cuts are combined to produce a grid (not shown) of cuts which separate each individual capacitor. The capacitors may be released from the glass plate by exposing the plate to ultra violet light. The UV light degrades the adhesive of the tape so that the capacitors may be detached from the plate. The capacitors may then be tested and packaged. An example of a completed capacitor is shown in FIG. 8, along with detailed technical specifications.

SPECIFIC EMBODIMENT 2

Figure 9A:
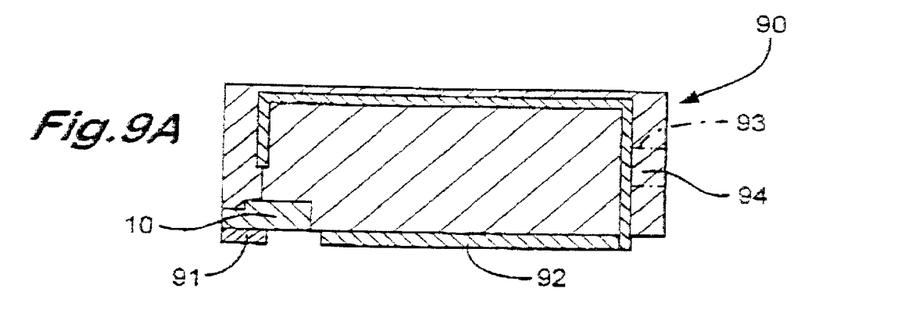
FIGS. 9A & 9B show an example of a capacitor produced according to the method of the second specific embodiment.
Figure 9B:
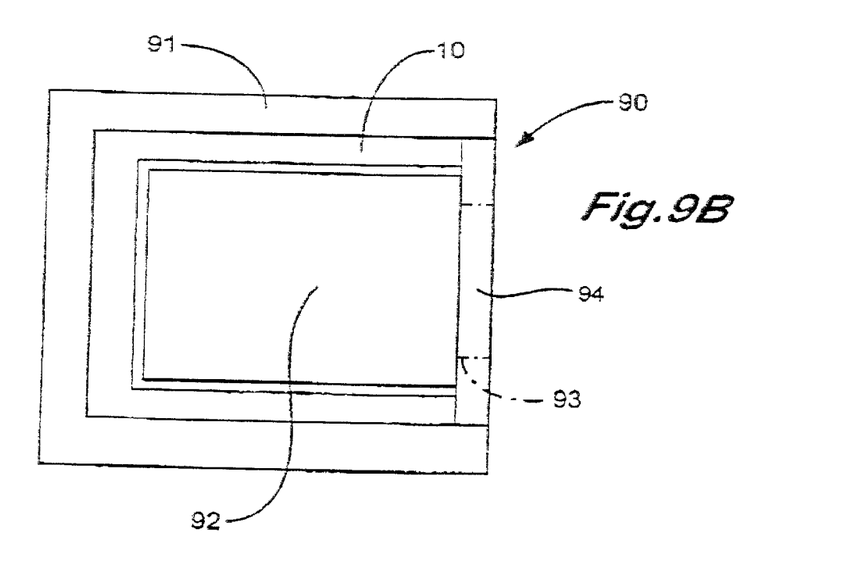
Figure 10A:
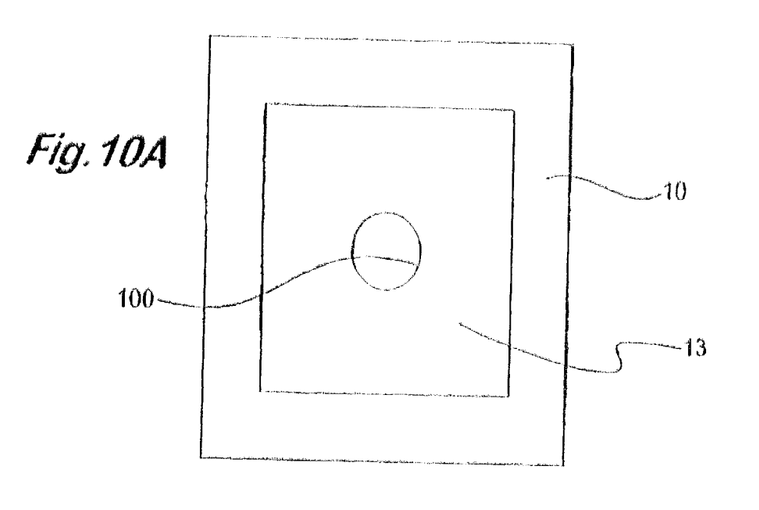
FIGS. 10 to 16 show another method according to the present invention.
Figure 10B:
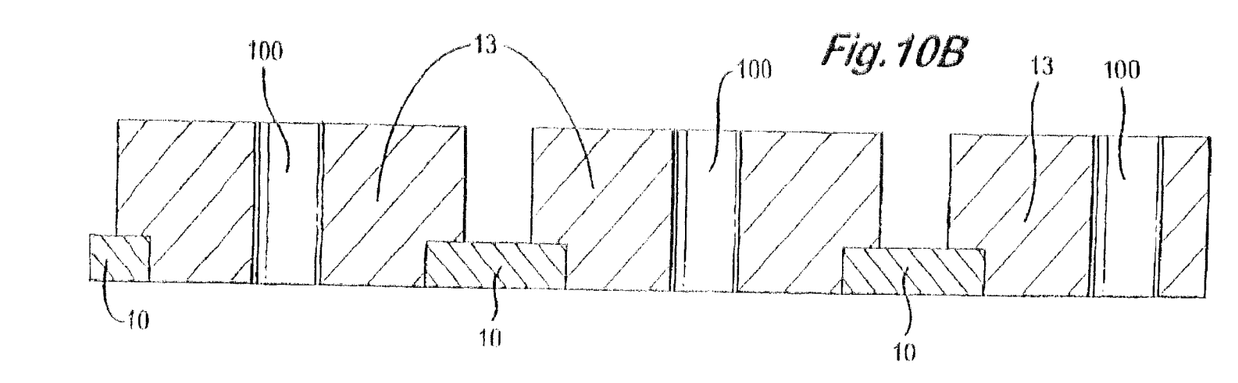
Figure 11A:
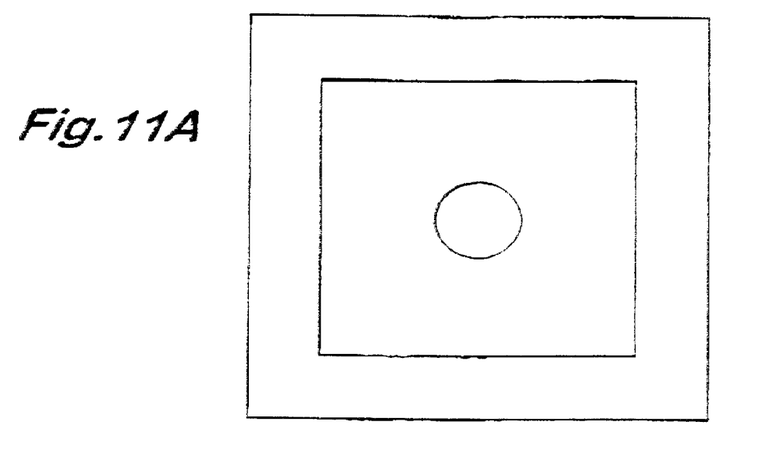
Figure 11B:
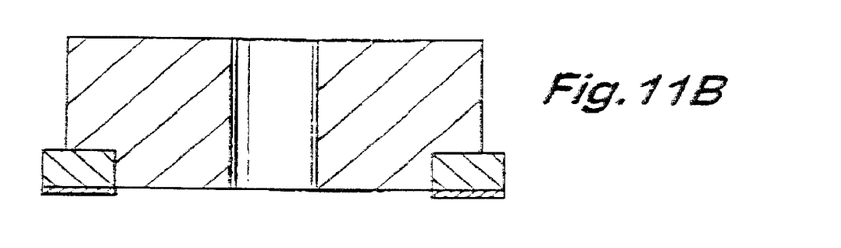
Figure 12A:
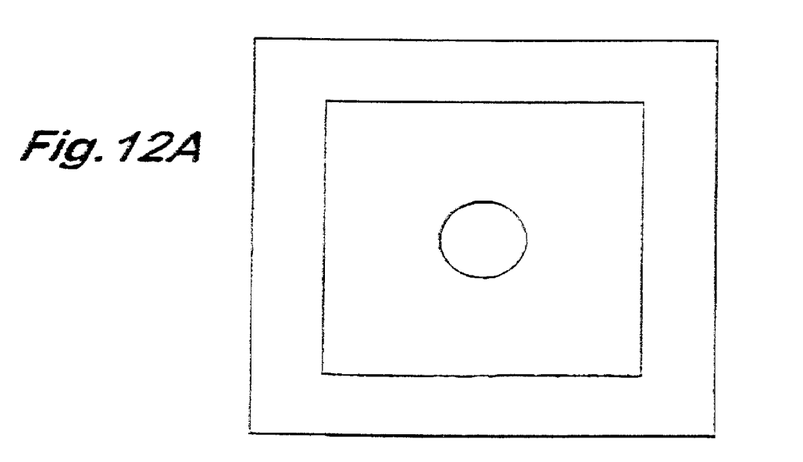
Figure 12B:
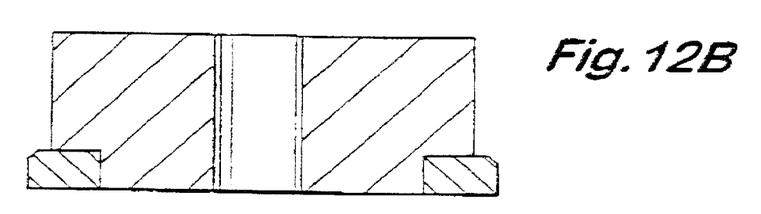
Figure 13A:
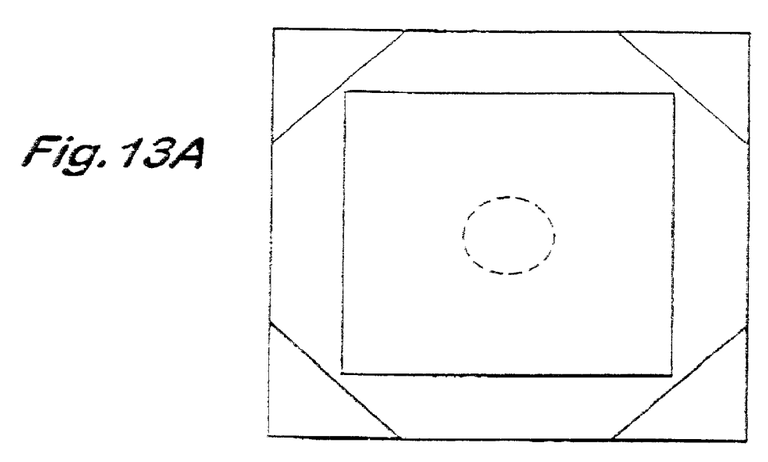
Figure 13B:
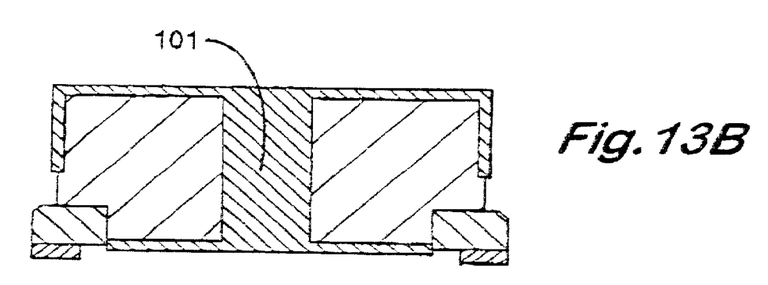
Figure 14A:
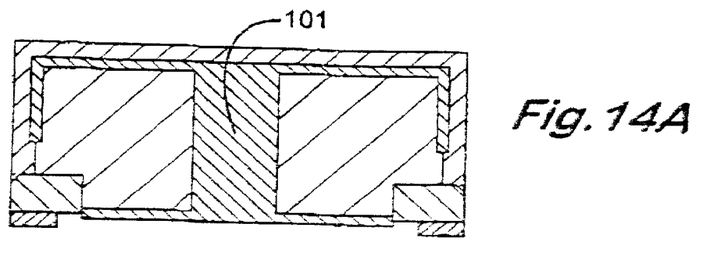
Figure 14B:
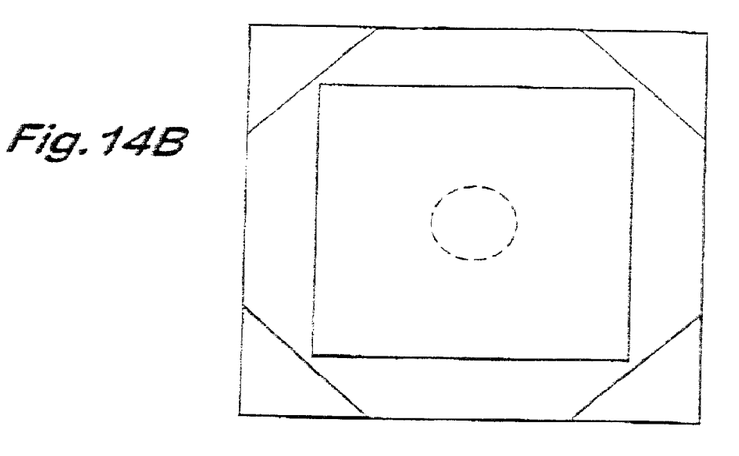
Figure 15A:
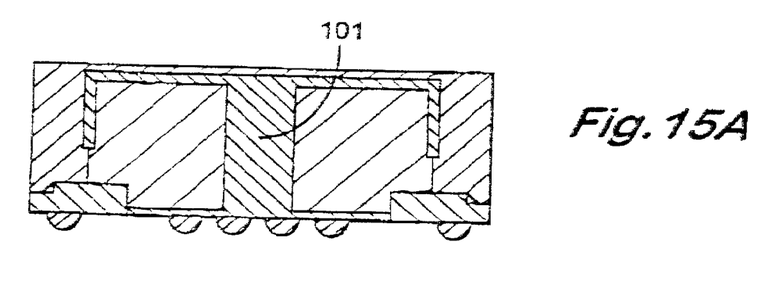
Figure 15B:
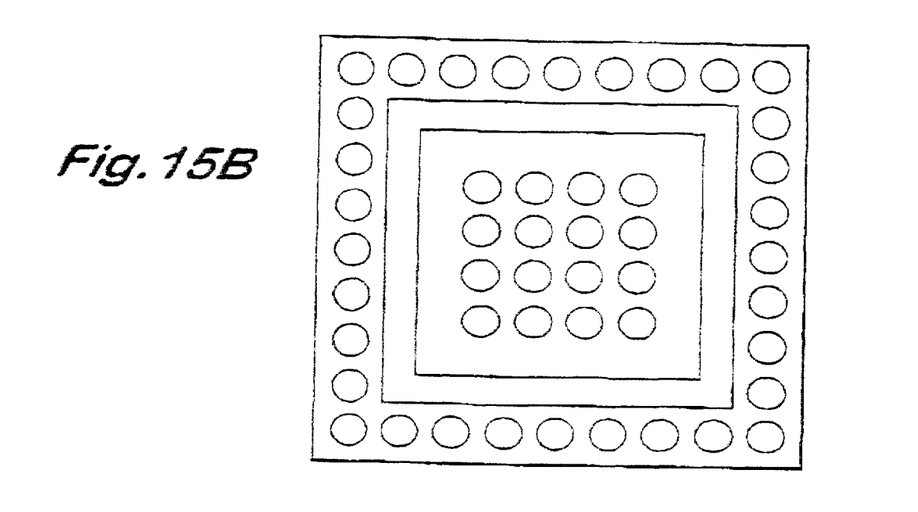
Figure 16:
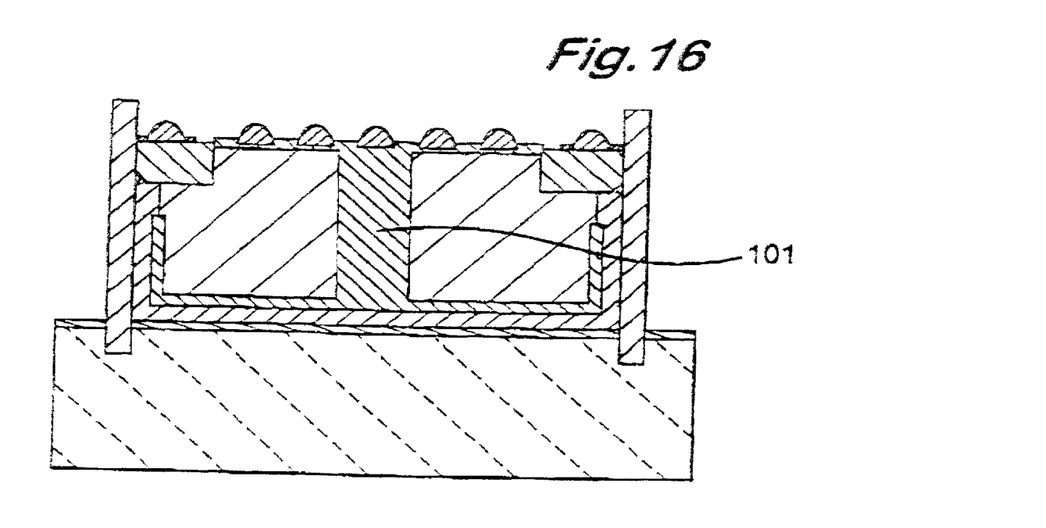

In order to maximize the volumetric efficiency of a capacitor, the volume of the porous body contained within the capacitor should be as large as practicable. This embodiment (shown in FIG. 9) provides a capacitor 90 with higher volumetric efficiency. In this case the green tantalum powder/binder mixture is pressed onto the substrate so that the mixture enters the aperture. In this case a slot 93 is formed in the green mixture along one side of the substrate framing the green mixture. This slot may be formed by machining or moulding. The slot is filled with resin 94 during the encapsulation process. The result is a capacitor as shown in the FIG. 9. This has a generally horse shoe configuration positive anode 91, and a square central cathode Dad 92. The processing steps are otherwise similiar to that For embodiment 1.

SPECIFIC EMBODIMENT 3

Figure 17A:
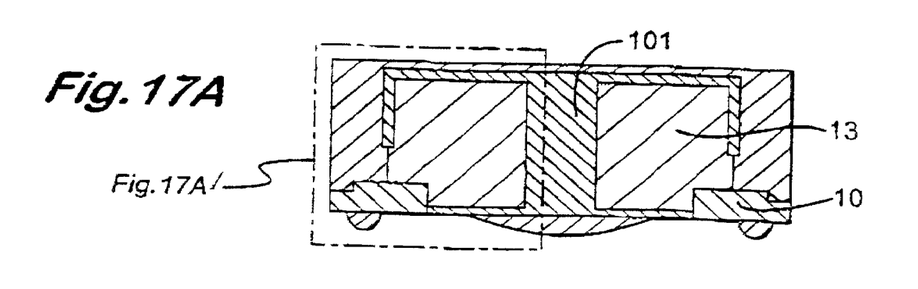
FIG. 17A is a sectional vire from one side of a capacitor produced according to the third embodiment.
Figure 17B:
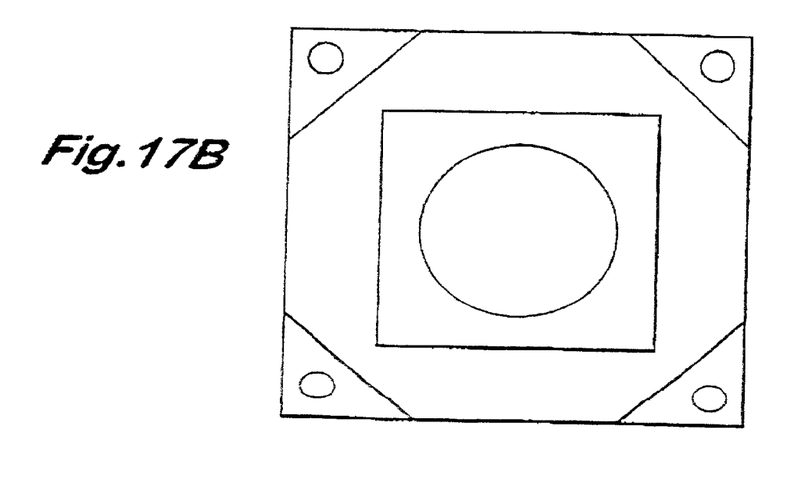
FIG. 17B is a view from the underside.

It has been found that it is desirable to electrically connect as much of the external surface area of the porous blocks together. This variation (FIGS. 10 to 16) of the invention produces improved capacitors by incorporating a conducting wick passing through the centre of each porous block and electrically connecting the top and bottom surface of the block. The process steps shown in FIGS. 10 to 16 correspond to those described for the embodiment 1, with the exception of the hole 100 formation in each porous block 13, and subsequent hole filling to form a wick 101. A finished capacitor according to this aspect of the invention is shown in FIG. 17. The structure of the dielectric, cathode and conducting layers applied during processing are also shown with reference to the key shown on the drawings.

The wick may be incorporated by drilling or punching a hole 100 through the block as part of the block machining process. When it comes to apply carbon/silver paste to the capacitor, the carbon paste also is applied to the interior surface of the holes. After the paste has cured the hole is plugged with silver conducting paste, which is itself allowed to cure. The other process steps are followed as for embodiment 1.

What is claimed is:

1. A method of manufacturing solid state capacitors comprising: providing an electrically conducting substrate having a plurality of apertures formed therethrough; forming plurality of porous bodies comprising valve action material on the substrate, a portion of each porous body being accommodated in an associated aperture; forming an electrically insulating layer over the free surface of the porous bodies; forming a conducting cathode layer over the electrically insulating layer applied to the porous bodies; and providing cathode termination means on an exposed underside surface of each coated porous body accommodated in the aperture, providing anode termination means on an underside surface of the substrate adjacent the aperture, the anode termination forming an electrical contact with the substrate material and the cathode termination forming an electrical contact with the cathode layer, and dividing the substrate into individual capacitor units, each comprising a porous body accommodated in an aperture-defining portion of the substrate.

2. A method as claimed in claim 1 wherein respective anode and cathode termination means have generally coplanar exposed contact surfaces so that the capacitor may stand with its underside on a flat surface with the contact surfaces on the flat surface.

3. A method as claimed in any preceding claim wherein the porous bodies are formed from a pre-form layer of porous valve action material pressed onto a top surface of the substrate.

4. A method as claimed in claim 3 wherein the pre-form layer is machined or otherwise shaped to form the porous bodies over the aperture and substrate top surface.

5. A method as claimed in any preceding claim wherein both the porous body free surfaces and exposed substrate surface are coated with the insulating layer and a portion of the insulating layer over the substrate is removed in order to allow an electrical contact with the substrate.

6. A method as claimed in claim 5 wherein a portion of the substrate underside is masked to prevent formation of a cathode layer thereon.

7. A method as claimed in any preceding claim wherein a conducting coating is provided over the cathode layer on the porous body.

8. A method as claimed in claim 7 where in the conducting coating extends over a substantial proportion of the surface of the porous body.

9. A method as claimed in claim 7 or claim 8 wherein a conducting wick is formed in the porous body, which wick electrically connects the conducting layers of different ends or sides of the porous body.

10. A solid state capacitor comprising: an electrically conducting substrate member; a porous body comprising valve action material abutting a surface portion of the substrate; an electrically insulating layer formed over the free surface of the porous cathode; a conducting cathode layer formed over the electrically insulating layer applied to the cathode body tree surface; and an anode terminal on a surface of the substrate member and a cathode terminal provided on a surface of the porous body, wherein the terminals are formed on a common surface or the capacitor.

11. A capacitor as claimed in claim 10 wherein the substrate member forms an exposed frame on an underside or the capacitor with an anode terminal formed thereon and the cathode terminal is formed on a portion of the porous body surface located within the frame.

12. A capacitor as claimed in claim 11 wherein the frame is open at one end, thereby giving a generally horse shoe configuration to the substrate meter.

\* \* \* \* \*

UNITED STATES PATENT AND TRADEMARK OFFICE
CERTIFICATE OF CORRECTION

PATENT NO.      : 6,643,121 B1
DATED           : November 4, 2003
INVENTOR(S)     : David Huntington It is certified that error appears in the above-identified patent and that said Letters Patent is hereby corrected as shown below:

<u>Column 8,</u>
Line 17, please delete "tree" and replace with -- free --.

Signed and Sealed this

Third Day of February, 2004

JON W. DUDAS
*Acting Director of the United States Patent and Trademark Office*